United States Patent [19]
Schnyder et al.

[11] Patent Number: 5,791,245
[45] Date of Patent: Aug. 11, 1998

[54] PRESSURE ROLL

[75] Inventors: Eugen Schnyder, Waltenschwil; Guenter Machguth, Wuerenlos; Egon Gasser, Winterthur, all of Switzerland

[73] Assignee: De Pretto-Escher Wyss S.R.L., Schio, Italy

[21] Appl. No.: 765,810
[22] PCT Filed: May 3, 1996
[86] PCT No.: PCT/CH96/00168
    § 371 Date: Jan. 3, 1997
    § 102(e) Date: Jan. 3, 1997

[30] Foreign Application Priority Data

May 5, 1995 [CH] Switzerland ............... 1299/95

[51] Int. Cl.$^6$ ................................. B41F 9/00
[52] U.S. Cl. ........................... 101/153; 492/7
[58] Field of Search ....................... 101/152, 153, 101/216, 348; 492/2, 4, 7, 5, 16, 17, 18, 54, 20, 57, 6; 100/163 R, 164, 162 B, 118, 153

[56] References Cited

U.S. PATENT DOCUMENTS

| 4,188,874 | 2/1980 | Heuss ................... 101/153 |
| 4,503,769 | 3/1985 | Andersen ............... 101/153 |
| 4,518,460 | 5/1985 | Hauser . | |
| 4,570,314 | 2/1986 | Holik et al. ............ 492/4 |

FOREIGN PATENT DOCUMENTS

| 0 698 684 | 2/1996 | European Pat. Off. . |
| 2 310 882 | 12/1976 | France . |
| 3338487 A1 | 5/1985 | Germany . |
| 1135901 | 12/1968 | United Kingdom . |

OTHER PUBLICATIONS

Patent Abstracts of Japan, vol. 12, No. 45 (M–667), Feb. 10, 1988 & JP.A.62 196189 (Showa Denko), Aug. 29, 1987, cf. Abstract.
Patent Abstracts of Japan, vol. 95, No. 5, Jun. 30, 1995 & JP.A.07 042728 (Tokai Rubber), Feb. 10, 1995, cf. Abstract.

*Primary Examiner*—J. Reed Fisher
*Attorney, Agent, or Firm*—Townsend and Townsend and Crew LLP

[57] ABSTRACT

A pressure roll having a fixed carrier and a rotating elastically deformable roll jacket that cooperates with a counter-roll and that is supported on the carrier via a hydrostatic support arrangement. The roll jacket has an inner surface that is movably guided in the peripheral direction over a concave support surface. The roll jacket is executed with a wall that is flexible in the radial direction and can conform to the counter-roll over a pressure zone whose width dimension in the peripheral direction is adjustable within a range of at least 8 mm to circa 40 mm. Furthermore, the roll jacket consists at least partially of an electrically conductive material in order to prevent an uncontrolled electrostatic charging of the jacket surface.

15 Claims, 1 Drawing Sheet

PRESSURE ROLL

BACKGROUND OF THE INVENTION

1. Field of the Invention

The invention relates to a pressure roll in accordance with the preamble of claim 1.

Pressure rolls of the named kind are often used in printing machines, in particular in rotogravure printing machines, as pressure rolls which cooperate with a printing cylinder in each case. A known pressure roll of this kind is executed with a highly elastic roller jacket in the form of a hollow cylinder of polyurethane or an elastomer which permits bending deflections transverse to its longitudinal axis and has a cross-section of substantially stable shape (K. A. Springstein "Die Spitzenqualitat im Tiefdruck hängt auch vom Presseursystem ab" (top quality in rotogravure printing also depends on the pressing system), reprint from the trade journal "Deutscher Drucker", No. 28 dated 15 Sep. 1988). The roll jacket of the known pressure roll is pressed against the printing cylinder via hydrostatic support elements, with the formation of a substantially linear pressing zone with a relatively slight extent in the peripheral direction of the roll jacket. In that arrangement the pressing zone can be widened in a deflection zone which arises through a compression of the roller jacket to such an extent that a printing zone with a width of approximately 10 to 18 mm is formed. The ink applied to the printing cylinder in a printing machine must in each case be transferred to the matter to be printed in the region of this printing strip.

In order to ensure a reliable ink transfer at a printing speed of, for example, 15–20 m/sec, it is known to provide the roll jacket with an indirect or direct electrostatic printing aid (ESA). These known printing aids are, however, relatively complicated and expensive and maintenance-intensive systems. To achieve a high print quality, it is furthermore essential that the width of the printed strip or band remains constant during the printing process. In previous pressure rolls of the named kind, and as a result of load changes in the roll zone in certain cases, e.g. when printing printed matter with longitudinal sections of differing thickness, correspondingly differing tangential forces can act on the individual longitudinal sections, with it being possible for the respective effective width of the printing strip to vary and thus for distortions of the printed matter to arise, through which the quality of the ink transfer can be impaired.

SUMMARY OF THE INVENTION

The object of the invention is to provide a further developed pressure roll suitable for various applications of the initially named kind which enables the formation of a pressure zone with a constant gap width that is adjustable independently of the respective loading and which permits an intentional influencing of the dwell time of a web of material passing through the pressing position, which can be used for a treatment, and which ensures a treatment of the web of material travelling through the pressure zone that is free from electrostatic auxiliary devices, or can at least be achieved with reduced electrostatic charging, even at a running speed of 20 m/sec or more.

Through the flexibility in the radial direction of the roll jacket of the press roll designed in accordance with the invention, a press gap can be achieved between it and the counter-roll whose width, in comparison with previous embodiments, can be freely chosen within a larger peripheral region of the counter-roll, and this width can amount to a multiple of the gap widths possible with previous embodiments. Accordingly, a low-distortion guidance of the material web—e.g. a paper or textile web—can be achieved which is independent of the respective stressing, and/or its dwell time in the press gap can be lengthened to such an extent that the use of electrostatic auxiliary devices is superfluous or that their use can at least be largely restricted. The pressure roll executed in accordance with the invention is particularly advantageous for printing machines since, on the one hand, e.g. in decorative printing, it ensures a constant width of the printed strip uninfluenced by changes in load even at gap widths of from 8 to 10 mm and, on the other hand, enables a corresponding lengthening of the dwell time of the printing ink in the printing zone which can be utilized for the ink transfer. The lengthened dwell time thereby results in additional freedom for the use of novel ink systems which, for example, require a longer drying time than previous systems. The execution of the pressure roll in accordance with the invention also permits a corresponding lengthening of the dwell time of a textile web to be compressed and/or to be provided with a structure, e.g. an embedded structure, in the press gap.

DETAILED DESCRIPTION OF THE PREFERRED EXEMPLARY EMBODIMENTS

Figure 1:
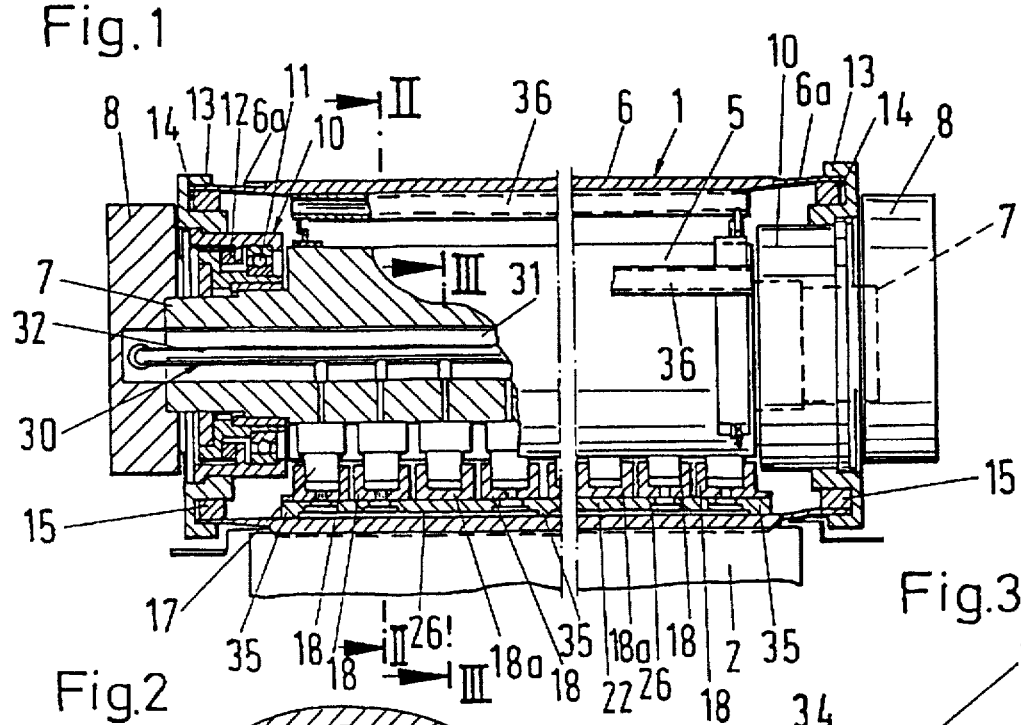
FIG. 1 is a partial, section view of a printing machine pressure roll in accordance with the invention which cooperates with a printing cylinder.
Figure 2:
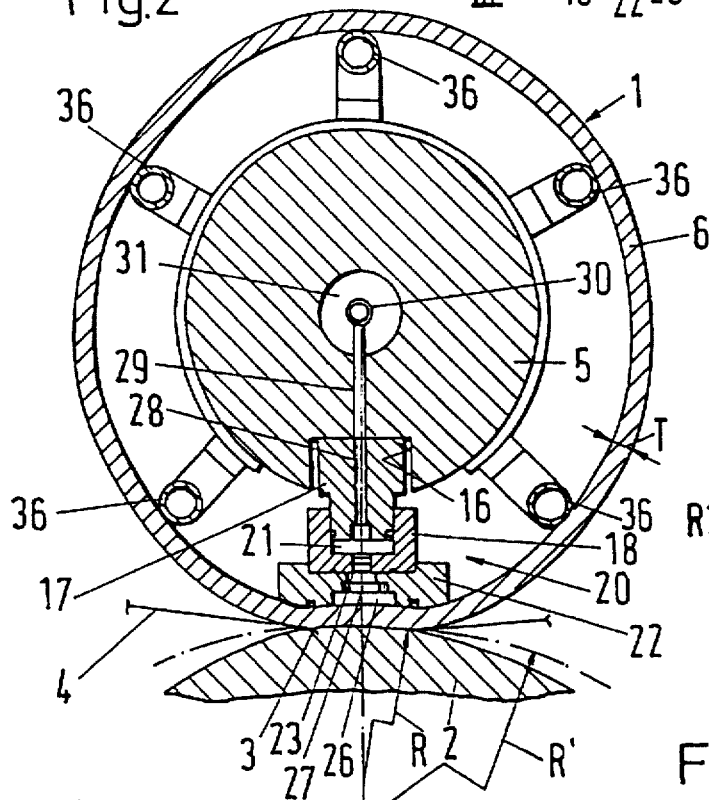
FIG. 2 is a section of the pressure roll in accordance with the invention corresponding to the line II—II in FIG. 1.

The pressure roll 1 of FIGS. 1 and 2 is arranged as a pressure roll in a non-illustrated printing machine, in the present example in a rotogravure printing machine, and cooperates with a counter-roll 2, illustrated as a forming cylinder of the printing machine, in a printing zone 3 through which there is guided a paper web 4 on which printing is to take place. The pressure roll 1 comprises, as is, for example, known from the initially cited reference, a fixed carrier 5 and a roll jacket 6 which can be rotated about the latter and consists of an elastically deformable material, e.g. of a plastic. The roll jacket 6 of the pressure roll 1 in accordance with the invention consists at least partially of an electrically conductive material, in the example illustrated of an elastomer, which is executed with an insulating inner layer and an outer layer formed as a "semiconductor". The elastomer can also be reinforced, e.g. by a fabric.

As seen in FIG. 1 the carrier 5 is secured at both its ends by means of bearing spigots 7 in holder blocks 8 which are each mounted on a non-illustrated carrier of the printing machine. Support rings 13 are rotatably journalled on the bearing spigots 7 via bearing arrangements 10 which contain roller bearings 11 and sealing means 12. The support rings 13 are executed with ring-shaped grooves 14 in which the ends 6a of the roll jacket 6 are each secured by means of a clamping ring 15.

The carrier 5 is executed with a longitudinal groove 16 in which a row of piston-shaped guide elements 17 of a hydrostatic support arrangement 20 are mounted in a fixed position. The support arrangement 20 contains a corresponding number of cylinder-shaped support elements 18, 18a each of which movably and sealingly cooperates with one of the guide elements 17 and bounds a pressure space 21. The support arrangement 20 further contains a strip-shaped support part 22 which is coupled to all support elements 18, 18a and extends substantially over the working length of the roll jacket 6 and which is secured to the support elements 18 by means of screws 23.

Figure 3:
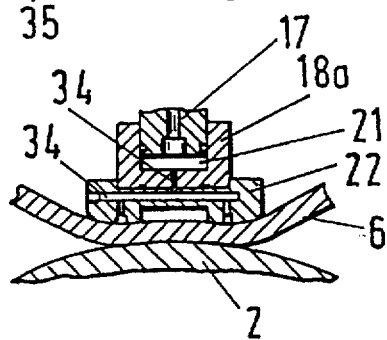
FIG. 3 is a partial section of the pressure roll corresponding to the line III—III in FIG. 1.

As is seen in FIGS. 2 and 3 in particular, the roll jacket 6 is executed with a wall which is flexible in the radial direction and permits the roll jacket 6 to conform with the counter-roll 2 over a section of its periphery whose width dimension in the peripheral direction is, for example, 20 mm. Depending on the material and the wall thickness T of the roll jacket 6 a multiple of this width measurement can be achieved. On the other hand it can also be worthwhile, e.g. for decorative printing, to bring the roll jacket 6 and the counter-roll 2 together over a peripheral section with a substantially smaller width dimension, e.g. 8 to 10 mm.

Figure 4:
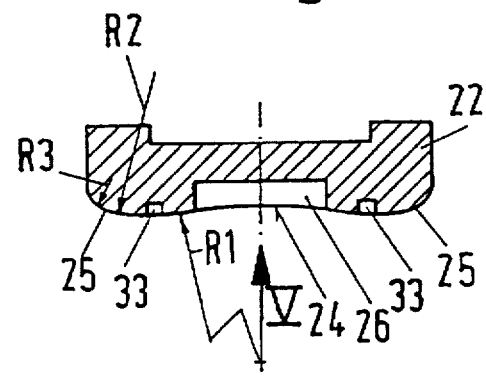
FIG. 4 is an enlarged detail view of FIG. 2.

The support part 22 is executed with a concave support surface 24 whose form is determined by a radius R1 in accordance with FIG. 4 which corresponds substantially to the sum of the radius R of the counter-roll 2 and the wall thickness T of the roll jacket 6. In order to ensure the universal use of the pressure roll 1, which is to cooperate with counter-rolls 2 of differing diameters or radii R and R', it is expedient for the radius R1 of the support surface 24 to be matched to the radius R of the smallest counter-roll 2 to be used. On at least one longitudinal side of the support part 22, and on both sides as shown in the drawing, two neighboring, convex guide surfaces 25 are associated with the concave support surface 24. Their shape is determined by a radius R2 which is equal to or less than the radius of a cylindrical surface determined by the inner surface of the roll jacket 6. These convex guide surfaces 25 facilitate the introduction of the roll jacket 6 into the pressure zone formed between the support surface 24 and the counter-roll 2 during its rotational movement.

The support surface 24 of the support part 22 is provided with hydrostatic bearing pockets 26 for a hydrostatic lubrication system. The bearing pockets 26 are connected to the pressure spaces 21 of the support elements 18 through restrictor bores 27 provided in the screws 23. The pressure spaces 21 are each connected via bores 28 and 29 passing through the guide part 17 and the carrier 5 respectively to a supply system 30 for a hydraulic pressure fluid. The supply system 30 is arranged in a central longitudinal bore 31 of the carrier 5 and indicated in the example illustrated by a tubular line 32 passing through the longitudinal bore 31 and connected to a non-illustrated source of the hydraulic fluid.

In addition to a compensation of the bending deflection, a substantially constant hydrostatic lubrication gap is maintained between the support surface 24 and the inner surface of the roll jacket 6 through the support arrangement 20 and the described design of the support part 22. As can be seen in particular in FIGS. 3 and 4, hydrostatic bearing pockets 33 through which a lateral stabilization of the support part 22 can be achieved can also be formed in the guide surfaces 25. The bearing pockets 33 are connected to the pressure spaces 21 of the correspondingly positioned support elements 18a through restrictor bores 34 arranged distributed over the length of the support part 22.

Figure 5:
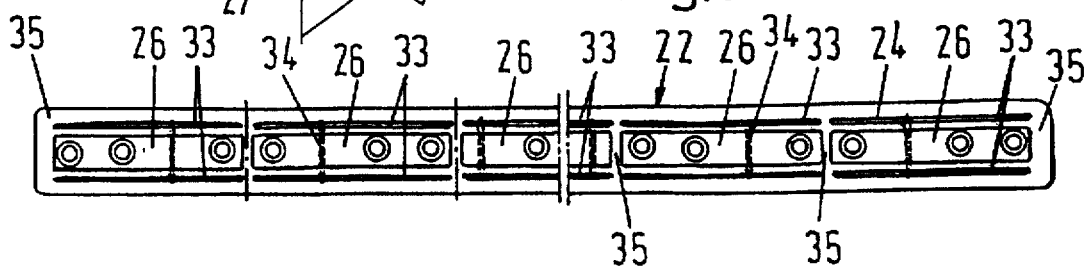
FIG. 5 is a partial view of the detail corresponding to the arrow V in FIG. 4.

As can be seen from FIGS. 1 and 5 in particular, the bearing pockets 26 and 33 are each bounded in the longitudinal direction of the support part 22 by bridge parts or web portions 35 of the guide surface 24. Instead of the illustrated embodiment with a plurality of bearing pockets 26 and 33, an embodiment can also be provided with a single bearing pocket 26 extending over the length of the support part 22 and/or with correspondingly extending bearing pockets 33 which are only bounded by the bridge parts 35 formed in the end sections of the guide part 22.

An embodiment is also possible in which the support part 22 extends only over a part of the working length of the roll jacket 6 or only over some of the support elements 18 respectively. A plurality of support parts 22 arranged next to one another in the longitudinal direction can also be provided, each connected to some of the support elements 18. Furthermore, support elements 18 can also be executed with concave support surfaces 24 and cooperate directly with the roll jacket 6, in which case the provision of a strip-shaped support part 22 is superfluous. In order to influence the pressure distribution, the bearing pocket or the individual bearing pockets 26 and 33 of the support arrangement 20 can also be combined with a non-illustrated apparatus for hydrodynamic pressure assistance, whereby the bearing pockets 26 can be executed with smaller dimensions.

The carrier 5 is provided with at least one guide part, in the illustrations with five guide parts 36 in the form of support carriers for the inner surface of the roll jacket 6, which are displaced in the peripheral direction with respect to the support arrangement 20. The guide parts 36 are supported only in the end regions of the carrier 5 so that they permit bending deflections of the carrier 5 and at the same time ensure a form-stable guidance of the roll jacket 6. In a different, non-illustrated embodiment, corresponding guide parts 35 can be coupled to the bearing arrangements 10. Instead of support carriers, a guide part, e.g. a trough-like guide part, can also be provided which extends over a portion of the periphery of the inner surface of the roll jacket 6.

A pressure roll 1 in accordance with FIGS. 1 and 2 can also be provided as the working roll of a non-illustrated apparatus for treating, e.g. compressing or embossing, a material web, such as a cloth or a non-woven article. A guide roll with a smooth jacket surface or an embossing roll with a correspondingly structured surface can be provided as a counter-roll 2. Accordingly, in an embodiment of this kind the dwell time of the material web in the effective zone can also be lengthened, an uncontrolled electrostatic charging of the jacket surface can be avoided, and thus the processing of sensitive textile webs, e.g. those containing a plastic component, can be simplified.

In summary, the invention can be described as follows:

The pressure roll has a fixed carrier and a rotating elastically deformable roll jacket which cooperates with a counter-roll and which is supported on the carrier via a hydrostatic support arrangement and whose inner surface is movably guided in the peripheral direction over a concave support surface. The roll jacket is executed with a wall which is flexible in the radial direction and can conform to the counter-roll over a pressure zone whose width dimension in the peripheral direction is adjustable within a range of at least 8 mm to circa 40 mm. Furthermore, the roll jacket consists at least partially of an electrically conductive material in order to prevent an uncontrolled electrostatic charging of the jacket surface. Accordingly, a treatment of a material web can be achieved which is free of electrostatic auxiliary devices, or can at least be accomplished with reduced electrostatic charging, e.g. a simplified transfer of printing ink to a printing material.

What is claimed is:

1. A pressure roll comprising:
    a fixed carrier including at least one guide surface that includes a support surface;
    a roll jacket that rotates about the fixed carrier and is formed of an elastically deformable material, the roll jacket comprising:
        an electrically conductive layer, and
        an inner surface having a substantially circular cylindrical shape, wherein the roll jacket is capable of moving along the support surface and the guide surface at the inner surface; and
    a counter-roll that forms a pressure zone in conjunction with the roll jacket, the pressure zone having an adjustable width.

2. The pressure roll of claim 1 wherein the support surface possesses a concave configuration in the circumferential direction of the roll jacket.

3. The pressure roll of claim 1 wherein the pressure zone width is adjustable in a range of 8 mm to 40 mm.

4. The pressure roll of claim 1 wherein the support surface has a radius that corresponds substantially to the sum of the radius of the counter-roll and the thickness of the roll jacket.

5. The pressure roll of claim 1 further comprising at least one convexly shaped guide surface associated with the support surface, the at least one convexly shaped guide surface being adjacently disposed along a peripheral direction, the shape of the at least one convexly shaped guide surface being determined by a radius that is equal to a radius of a cylindrical surface determined by the inner surface of the roll jacket.

6. The pressure roll of claim 1 further comprising at least one convexly shaped guide surface associated with the support surface, the at least one convexly shaped guide surface being adjacently disposed along a peripheral direction, the shape of the at least one convexly shaped guide surface being determined by a radius that is less than a radius of a cylindrical surface determined by the inner surface of the roll jacket.

7. The pressure roll of claim 1 further comprising a support arrangement that contains a plurality of hydrostatic support elements adjacently arranged in a longitudinal direction of the fixed carrier in which the support surface is formed on at least one support part that is braced against the fixed carrier via the hydrostatic support elements.

8. The pressure roll of claim 7 wherein the support part is in the form of a support strip that extends substantially over a determinable working length of the roll jacket.

9. The pressure roll of claim 1 wherein the support surface includes at least one hydrostatic bearing pocket that is bounded in the longitudinal direction of the fixed carrier by at least two bridge parts of the support surface.

10. The pressure roll of claim 1 wherein the guide surface includes at least one hydrostatic bearing pocket that is bounded in the longitudinal direction of the fixed carrier by at least two bridge parts of the guide surface.

11. The pressure roll of claim 1 wherein the fixed carrier further includes at least one guide part for the inner surface of the roll jacket that is arranged to be displaced with respect to the support arrangement in the peripheral direction and extends over a portion of its longitudinal extent.

12. The pressure roll of claim 11 wherein the guide part is in the form of a support carrier that is supported at the end regions of the fixed carrier and permits bending deflections of the fixed carrier.

13. The pressure roll of claim 1 wherein the electrically conductive layer is an outer layer, and the roll jacket further comprises an inner insulating layer.

14. A printing machine comprising a pressure roll device, the pressure roll device comprising:
    a fixed carrier including at least one guide surface that includes a support surface;
    a roll jacket that rotates about the fixed carrier and is formed of an elastically deformable material, the roll jacket comprising:
        an electrically conductive layer, and
        an inner surface having a substantially circular cylindrical shape, wherein the roll jacket is capable of moving along the support surface and the guide surface at the inner surface; and
    a counter-roll that forms a pressure zone in conjunction with the roll jacket, the pressure zone having an adjustable width.

15. The printing machine of claim 14 wherein the printing machine is a rotogravure printing machine.

* * * * *